J. C. Currier.
Window Sash.
No. 35,302.                    Patented May 20, 1862.
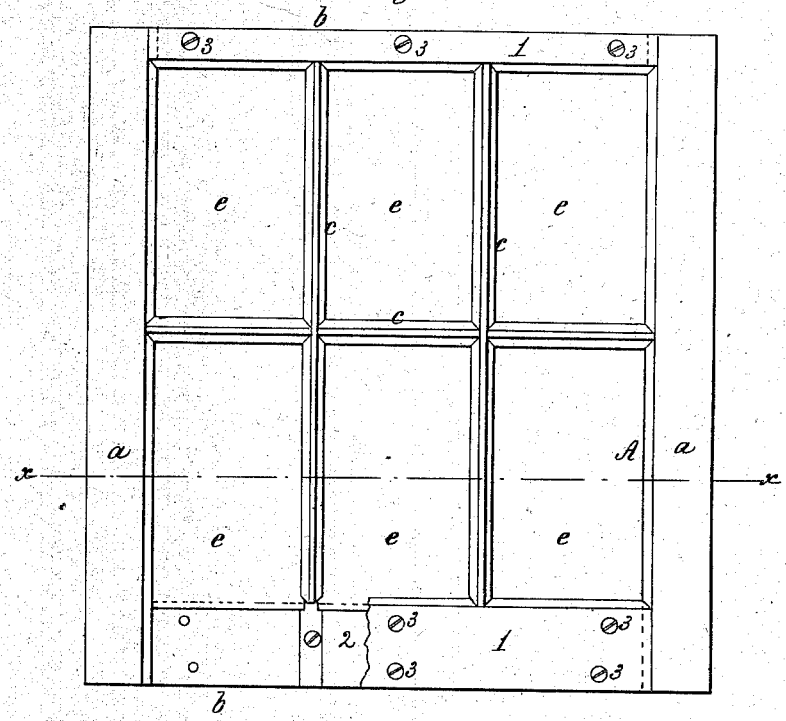
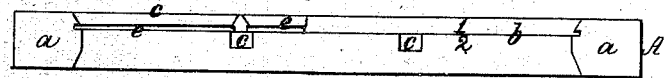
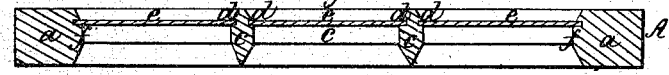
Witnesses
J. W. Coombs
R. J. Gawley
Inventor
James C. Currier
per Munn & Co
Attorneys

UNITED STATES PATENT OFFICE.

JAMES C. CURRIER, OF BRADFORD, VERMONT.

IMPROVEMENT IN WINDOW-SASHES.

Specification forming part of Letters Patent No. 35,302, dated May 20, 1862.

*To all whom it may concern:*

Be it known that I, JAMES C. CURRIER, of Bradford, in the county of Orange and State of Vermont, have invented a new and useful Improvement in Window-Sashes; and I do hereby declare that the following is a full, clear, and exact description of the same, reference being had to the accompanying drawings, making a part of this specification, in which—

Figure 1 is a face or front view of my invention. Fig. 2 is an end view of the same; Fig. 3, a transverse section of the same, taken in the line $x$ $x$, Fig. 1.

Similar letters of reference indicate corresponding parts in the several figures.

This invention relates to an improved manner of securing the lights or panes of glass in the sash, as hereinafter fully shown and described, whereby the use of putty or any other plastic substance is entirely avoided and the panes not only secured in the sash so as to have water-tight or water-proof joints, but also in such a manner as to admit of being very readily inserted in the sash and removed therefrom, so as to facilitate the removal of broken panes and the insertion of new ones therein without injuring the sash, as is frequently the case in cutting away the putty hitherto used, and which becomes quite hard by age.

To enable those skilled in the art to fully understand and construct my invention, I will proceed to describe it.

A represents the sash of a window, $a$ $a$ being the stiles or side strips, $b$ $b$ the top and bottom rails, and $c$ the cross-pieces. The top and bottom rails, $b$ $b$, are each formed of two longitudinal parts, 1 2, the former being secured to the latter by screws 3, and the ends of the upright cross-pieces $c$ are "let in" the parts 2 of the rails, said ends being notched, so as to admit of the part 1 being secured to 2, and having its outer surface "flush" with the outer surfaces of the cross-pieces.

Both sides of the cross-pieces $c$ are grooved longitudinally, as shown at $d$, so as to receive the edges of the panes $e$ of glass. These grooves are in the same plane with the outer surfaces of the parts 2 of the rails $b$ $b$ of the sash, the grooves in the horizontal rail $c$ receiving the ends of the panes at the center of the sash, and the parts 1 of the rails, when screwed to part 2, covering the ends of the panes at the upper and lower ends of the sash.

The inner sides of the stiles $a$ $a$ of the sash are also grooved longitudinally, as shown at $f$, and the grooves $d$ in the sides of the vertical cross-pieces $c$ and the grooves $f$ in the stiles receive the sides of the panes.

In order to insert the panes $e$ in the sash, the parts 1 of the rails $b$ $b$ are unscrewed and the panes shoved along in the grooves over the parts 2. The parts 1 are then screwed to the parts 2, and the panes thereby firmly secured in the sash. The grooves $d$ $f$ are of such a width as to receive snugly the edges of the panes $e$ and form tight or weather-proof joints. By this arrangement it will be seen that broken panes of glass may be very readily removed from the sash and whole ones inserted in their place and without disfiguring or marring the sash in the least. The panes also may be secured perfectly weather-proof in the sash and will remain so indefinitely, which is not the case where putty is used, for the latter very frequently in hardening will crack and shell off. The removal of broken panes of glass from a sash in which they are secured by putty in the usual way is attended with some difficulty, especially if the putty be old and hard, as it frequently adheres so tenaciously to the sash as to cause the latter to be split in removing the putty with a knife, and the sash is consequently disfigured. Considerable time also is consumed in removing the putty in order to detach the unbroken panes and in applying fresh putty in inserting new or whole ones.

The invention will not materially add to the cost in constructing sashes, while much labor will be saved the manufacturer in inserting the glass, as well as labor and time saved by subsequent owners in replacing broken panes.

Having thus described my invention, what I claim as new, and desire to secure by Letters Patent, is—

A window-sash having its top and bottom rails, $b$ $b$, formed of two parts, 1 2, and its cross-pieces $c$ and stiles $a$ $a$, grooved, as shown, to admit of the insertion and securing of the panes $e$ in the sash, substantially as shown and described.

J. C. CURRIER.

Witnesses:
 RICHARDSON GAWLEY,
 JAMES LAIRD.